United States Patent

[11] 3,539,241

[72] Inventor Juris Upatnieks
 Ann Arbor, Michigan
[21] Appl. No. 638,031
[22] Filed May 12, 1967
[45] Patented Nov. 10, 1970
[73] Assignee Holotron Corporation
 Wilmington, Delaware
 a corporation of Delaware

[54] METHOD OF IMAGING TRANSPARENT OBJECTS WITH COHERENT LIGHT
 5 Claims, 4 Drawing Figs.
[52] U.S. Cl. ................................................. 350/3.5
[51] Int. Cl. ................................................. G02b 5/02
[50] Field of Search ........................................ 350/3.5, 162, 314; 240/1.3; 161/3.5

[56] References Cited

Armitage and Lohmann, Applied Optics, vol. 4, No. 4 pp. 461–467 (April 1965).
Gabor, Electronics and Power, pp. 230–234 (July 1966).
De Bitetto, Applied Physics Letters, vol. 8, No. 4, pp. 78–80 (February 1966).
Suzuki, Japanese Journal of Applied Physics, vol. 5, No. 9, pp. 814–817 (September 1966).

*Primary Examiner*—David Schonberg
*Assistant Examiner*—Robert L. Sherman
*Attorney*—Woodcock, Washburn, Kurtz and Mackiewicz

ABSTRACT: A method of improving the quality of images formed by illuminating nondiffuse transparent objects with coherent light, such as in microholography, wherein undesirable noise and grain is appreciably reduced by illuminating the object with coherent light that is characterized in having constant amplitude and random phase. This type of coherent light may be obtained by inserting a phase modulator in the path of the illuminating light in close proximity to the object, the phase modulator acting to scatter the light at very small angles.

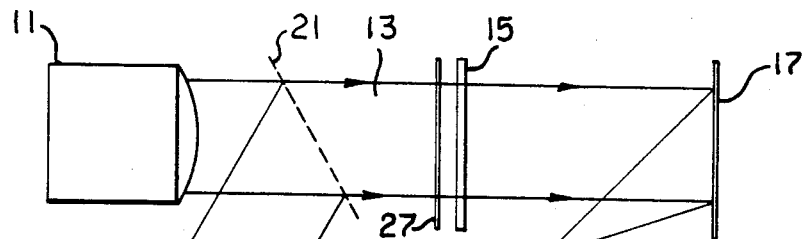
Fig. 1A
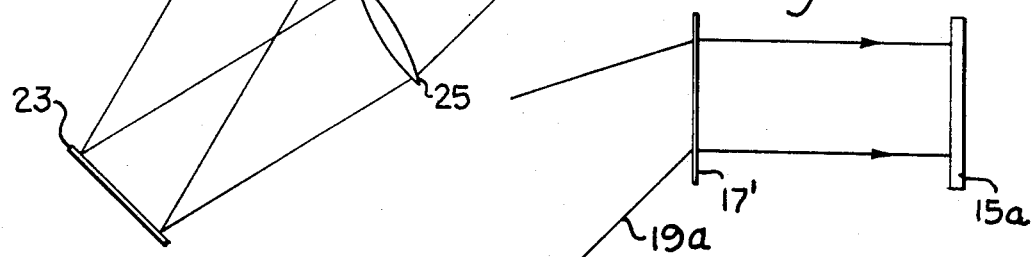
Fig. 1B
Fig. 2
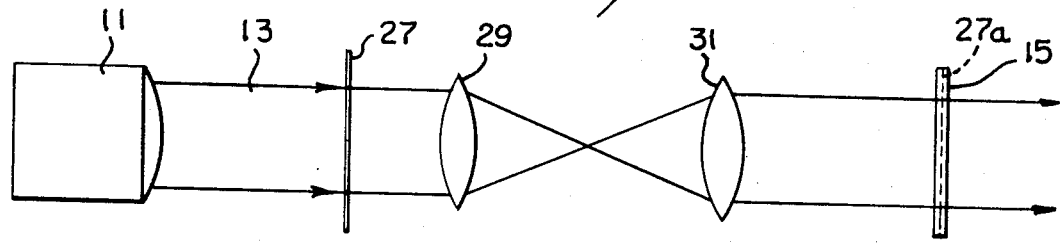
Fig. 3
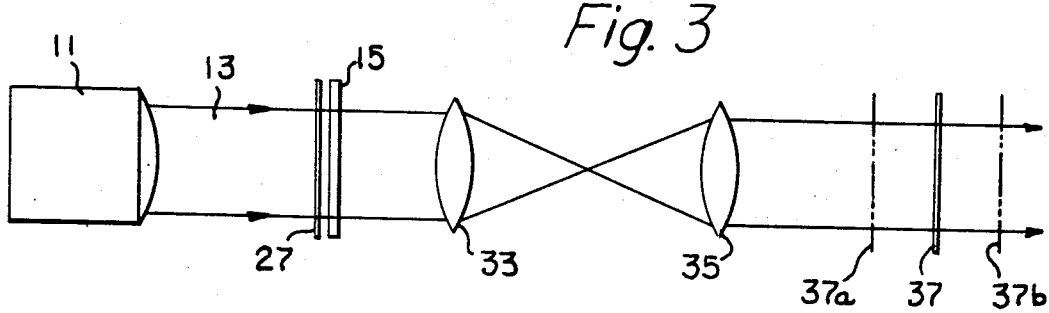

METHOD OF IMAGING TRANSPARENT OBJECTS WITH COHERENT LIGHT

BACKGROUND OF THE INVENTION

1. Field of the Invention

This invention relates generally to a method of producing images from transparent objects and more particularly to such methods wherein a source of coherent light is used to illuminate a transparent object to produce an image.

The invention of the laser as a practical source of coherent light has brought about several applications wherein a transparent object is illuminated with coherent light to form an image. One of the principal applications is in the field of microscopy where a thin section to be examined is illuminated with light and viewed with an optical system. For some uses it is desirable to illuminate the object with laser light because of its very intense brightness. Another related application is in the field of holography or microholography where it is desirable to make a hologram of the specimen or object being illuminated. In this case it is necessary to use coherent light such as a laser to illuminate the object. By producing a hologram, the wavefront coming from the specimen is preserved and can be reconstructed at a later time for use with one or several microscopy techniques.

2. Description of the Prior Art

The use of coherent light to illuminate transparent objects has given rise to problems not encountered in ordinary incoherent imaging of transparencies. One major problem encountered is the formation of spurious diffraction patterns, usually appearing as circular Fresnel zone patterns, resulting from such things as dust or dirt on the transparent object or imperfections in an optical lens system used in the imaging process. These dust particles or lens imperfections diffract the light so as to cause interference between the diffracted light and undiffracted light, thereby creating the undesirable interference ring pattern at the image plane. These undesired ring patterns are analogous to noise in a communication system and can be eliminated with the utilization of a diffusion plate interposed between the source of coherent light and the transparent object being imaged. The diffusion plate, in effect, destroys the regularity of the spatial amplitude and phase of the illuminating wavefront without affecting the temporal coherence thereof. That is, the object transparency is illuminated with a wavefront having a phase that varies randomly from point to point thereacross in a time invariant manner. This method effectively spreads out the noise over the entire image plane, thereby rendering it virtually invisible to the observer. The use of a diffusing plate in a coherent light transparency imaging system is more fully explained in the November 1964 edition of the Journal of the Optical Society of America, beginning at page 1295 and entitled "Wavefront Reconstruction With Diffused Illumination and 3-Dimensional Objects" by Emmet N. Leith and Juris Upatnieks.

While the utilization of a diffusion plate in an imaging system of the type described effectively eliminates the problem of spurious diffraction patterns or noise, it creates another problem which in some applications is very objectionable. This problem now referred to is the production of a very discernible grainy background to the image resulting from the utilization of a diffusion plate in the illuminating beam. This grainy background is believed to be a result of the random amplitude produced by the diffusion screen. The grainy pattern, while not particularly objectionable in imaging objects of ordinary size, becomes a real problem in microimaging systems wherein the order of magnitude of size of the objects being imaged are of the same order as the grains themselves.

It is therefore an object of this invention to provide a method of imaging transparent objects with coherent radiation which eliminates both the noise and the grain heretofore present.

Another object of this invention is to provide a method of producing holograms of transparent objects which are capable of reconstructing images thereof which are relatively free of undesirable noise and grain.

SUMMARY OF THE INVENTION

Briefly, the objects of this invention are accomplished in a method of imaging transparent objects with coherent light wherein a phase modulator is placed in the system between the source of coherent light and the transparent object being imaged, the phase modulator having the property of randomly scattering the illuminating light at small angles thereby imparting a random phase on the illuminating beam while the amplitude thereof remains constant.

While the process which is regarded as the invention is distinctly pointed out and described in the appended claims, the underlying principles of this invention, together with a detailed description thereof, may be more readily apparent with reference to the following description taken in conjunction with the drawings in which:

BRIEF DESCRIPTION OF THE DRAWINGS

FIG. 1A illustrates an embodiment of this invention in which a hologram of a transparent object is produced;

FIG. 1B illustrates a reconstruction process from the hologram made in FIG. 1A;

FIG. 2 illustrates a preferred arrangement of a portion of the system illustrated in FIG. 1A; and FIG. 3 illustrates schematically a specific application in which the present invention may be employed.

DETAILED DESCRIPTION OF THE DRAWINGS

Referring to FIG. 1A, the invention is illustrated in an embodiment including an illuminating source of coherent radiation 11, which may be a laser, which produces a beam of spatial and temporal coherent radiation 13, a portion of which is directed to pass through a nondiffuse transparent object 15. A nondiffuse transparent object is any transparent object that does not scatter light at wide angles. Almost all transparent objects are nondiffuse; however, in the case of a diffuse transparent object, such as a ground glass diffusion screen, the present invention is not applicable, inasmuch as such an object practically destroys the amplitude and phase regularity of any light passing therethrough. The object 15 is preferably a two-dimensional object. However, the invention is applicable in the case of a three-dimensional transparent object of which only a selected planar portion is desired to be imaged.

The object 15, after being illuminated by beam 13 may be imaged by means of an optical lens system (not shown) such as in ordinary microscopy, or may be utilized to produce a hologram of the object 15 as is illustrated in FIG. 1A. In FIG. 1A, the beam 13 impinges upon a hologram detector surface 17 positioned at the hologram plane and is caused to interfere with a reference beam 19 derived from the same source 11 so as to be coherent therewith. The method for producing the reference beam 19 may include a beam splitter 21 inserted in the path of the beam 13, a mirror 23 to deflect the beam 19 to the hologram detector surface 17, and a lens 25 to make the reference beam diverging if so desired. The method of producing a hologram as thus far described in connection with FIG. 1A is now well known to those skilled in the art and no detailed description of this method is deemed necessary for the present purposes. Such a detailed description may be found in the U.S. application for Pat. Ser. No. 503,993, filed Oct. 23, 1965.

Reconstruction of an image of the object 15 from the hologram produced in FIG. 1A is illustrated in FIG. 1B in which a beam 19a is directed to the hologram 17' at the same angle as the reference beam 19 took during the construction process. An image 15a will appear in an image plane spaced from the hologram at a distance determined by the relative curvatures between the reference beam 19 in the construction process and the illuminating beam 19a.

If, during the construction of the hologram, there existed any dust or other imperfections in the system, the reconstructed image 15a will include diffraction patterns which are objectionable because they are regular in nature and thus draw the attention of the observer. Also, if a transparent-type object is being imaged with coherent radiation, imperfections in the imaging system utilized will cause such diffraction patterns at the image plane.

By introducing a phase modulator 27 directly in front of the transparent object 15 during the construction process of FIG. 1A, the resulting interference patterns in the reconstructed image 15a due to imperfections or dust in the system become irregular and thus relatively invisible, due to the random phase of the illuminating light. By imposing the requirement on the phase modulator 27 that the amplitude of the beam 13 passing therethrough remain constant, the image produced will be free of the grainy structure that is characteristic of images produced with diffused coherent light.

In order to prove that the desired results are truly accomplished according to the teachings of this invention, a mathematical analysis has been performed with respect to both the elimination of regular diffraction patterns and the elimination of the grain pattern background at the image plane. Without going into this mathematical analysis (for it is quite extensive and complex and is not necessary in the basic understanding of this invention) it suffices to say that in analyzing the mathematical expression for the wavefront at the image plane and considering the desired results intended to be accomplished, it was shown that in order to reduce the noise and the grain effects in the image, the phase term and the amplitude term of the illuminating light beam 13 were required to be respectively random and constant.

The phase modulator 27 may be of any desired type so long as the characteristics of random phase and constant amplitude are met. In carrying out actual tests of this invention, it has been found that such a phase modulator in its preferred form comprises a phase plate that scatters the illuminating light over very small angles in a random fashion. Such a phase plate may comprise a sheet of ordinary antiglare glass, one side of which has been polished flat. Another embodiment of such a phase plate comprises a sheet of glass or other transparent material in which shallow etches have been provided, or, alternatively, on which a special coating of suitable material has been applied. Additionally, in some cases it may be desirable to direct the object beam to a reflective phase modulator (which may be a mirror with an irregular surface) and then produce an image of the reflective phase modulator at a position coincident with or close to the object. It should be understood that the particular phase modulators disclosed herein are presently considered preferred forms of the phase modulator 27, but in no way limits the invention to such forms.

It has been found that the best results are obtained when the phase modulator 27 is positioned as close as possible to the transparent object 15. The reason for this is that when the phase modulator is spaced away from the object, interference may result due to the angular scattering of the light, result of which would be a modulation of the amplitude of the light beam 13 passing through the object 15. The spacing distance must be small enough so that the light scattered by the phase modulator impinges on the transparent object before it has traveled far enough to interfere with light from an adjacent position on the phase modulator.

Referring to FIG. 2, in a preferred form of the present invention an imaging system comprising a pair of lenses 29 and 31 are utilized to produce an image 27a of the phase modulator 27 at an image plane which is coplanar with the plane of the object 15. Although the imaging system of FIG. 2 is preferred, it is possible that with good quality phase modulators in which the angle of modulation is very small, a certain allowable separation distance exists between the phase modulator and the object and therefore it is not intended that the invention be limited to the embodiment illustrated in FIG. 2.

In the detailed mathematical analysis carried out in conjunction with testing the basic principles of this invention, it was determined that the lack of grainy structure at the image plane due to the employment of the phase modulator 27 occurs only where the amplitude of the image carrying wavefront is constant and further, that this constant amplitude wavefront occurs only at the image plane of the imaging system utilized, if any. Furthermore, it was determined that the frequency spectrum of the image carrying wavefront must be within the band pass of the optical imaging system utilized, or else the amplitude at the focal plane will not remain constant and the grainy appearance will be present. This observation puts the further requirement that the aperture of the imaging system be large enough to include the entire frequency band of the illuminating wavefront.

These observations give rise to specific applications of the discoveries underlying this invention, one of which is illustrated in FIG. 3. In FIG. 3 similar elements as those in FIG. 1A are utilized and are given like reference numerals. However, in FIG. 3 a system for imaging a transparent object is depicted rather than the system for producing a hologram as illustrated in FIG. 1A. Therefore, FIG. 3 includes a pair of lenses 33 and 35 utilized to produce an image of the object 15 at an image plane 37.

In FIG. 3, two additional planes 37a and 37b are illustrated on either side of the focal plane 37 of the imaging system. According to this invention, the grain free image will appear at the focal plane 37, but an out of focus grainy image will appear at both the out of focus planes 37a and 37b. By moving the image plane 37 along the path of the illuminating beam 13, for example, between the limits illustrated by planes 37a and 37b, the focal plane of the imaging system can be determined simply by observing at what position the grainy appearance disappears. It will be apparent that this method can also be used to determine any curvature existing in the field of the imaging system.

Another application of this invention utilizes a set of calibrated phase plates to determine the frequency response of an optical imaging system. In order to eliminate the grainy appearance at the image plane 37, the frequency band pass of the optical system used for imaging must be as large as the frequency bandwidth of the phase plate. That is, the properties of each phase plate can be represented by random phase changes over a frequency range, and in order to eliminate the grainy appearance, the imaging system must be able to transmit signals over this frequency range. If the band pass of the imaging system is less than the bandwidth of the phase plate, then the grainy appearance will not be eliminated. Thus, with a set of calibrated phase plates, each of a known bandwidth, the frequency response of an imaging system can be determined simply by observing which of the calibrated phase plates eliminates the grainy appearance at the image plane 37.

While the invention has been described in somewhat general terms without reference to a specific detailed and complex mathematical analysis, and while the invention has been illustrated in specific embodiments, it is not intended that the invention be limited to the specific embodiments illustrated. It is also considered desirable that the mathematical analysis be eliminated, inasmuch as it adds nothing to the understanding of the basic principles underlying this invention and may tend to confuse those not intimately familiar with mathematics on the level required by such analysis.

I claim:

1. In the method of illuminating a nondiffuse transparent object by passing therethrough a coherent light beam having a time invariant phase function thereacross, the improvement wherein a surface of said object transparency is illuminated with a surface of said coherent light beam having a uniform amplitude and randomly varying phase thereacross, whereby an object bearing coherent light beam is produced that contains information of said object transparency surface with reduced noise.

2. In a method of illuminating a nondiffuse transparent object by passing a coherent light beam therethrough, the improvement comprising the step of modifying said beam to have a uniform amplitude and time invariant randomly varying phase across said object by placing a phase modulator in said beam before striking the object and in close proximity or coincident with said object, whereby an object bearing coherent light beam is produced containing information of said object with reduced noise.

3. In a method of illuminating a nondiffuse transparent object by passing a coherent light beam therethrough, the improvement comprising the step of modifying said beam to have a uniform amplitude and time invariant randomly varying phase thereacross in a plane of said object by placing a phase modulator in said beam before striking the object and imaging said modulator to a position in space coincident with said object plane, whereby an object bearing coherent light beam is produced containing information of said object plane with reduced noise.

4. The method as defined in claim 2 wherein said phase modulator is characterized in that it scatters illuminating light at small but random angles.

5. The method as defined in claim 4 wherein said phase modulator comprises a sheet of nonglare glass, one side of which has been polished flat.